May 23, 1944.　　　　　E. G. DOKE　　　　　2,349,490
FLOOR SECURING CLIP
Filed Oct. 2, 1941　　　　2 Sheets-Sheet 1
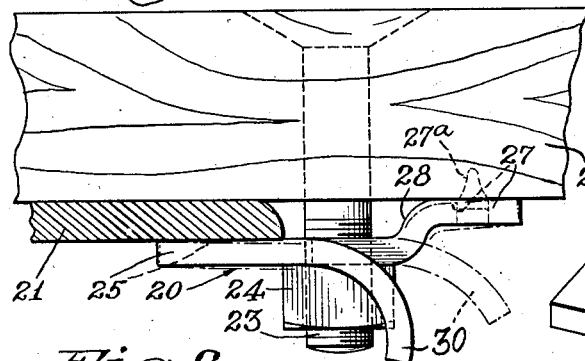
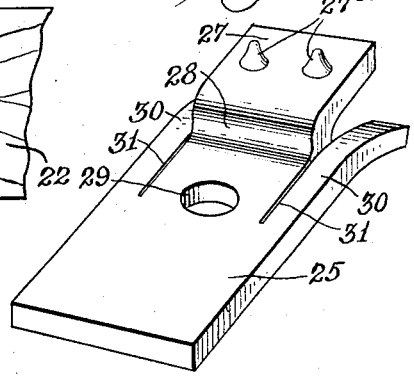
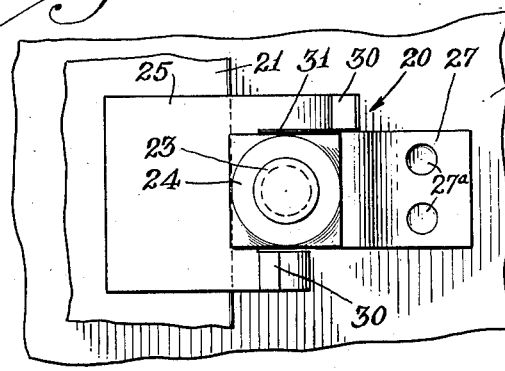
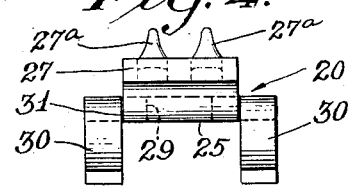
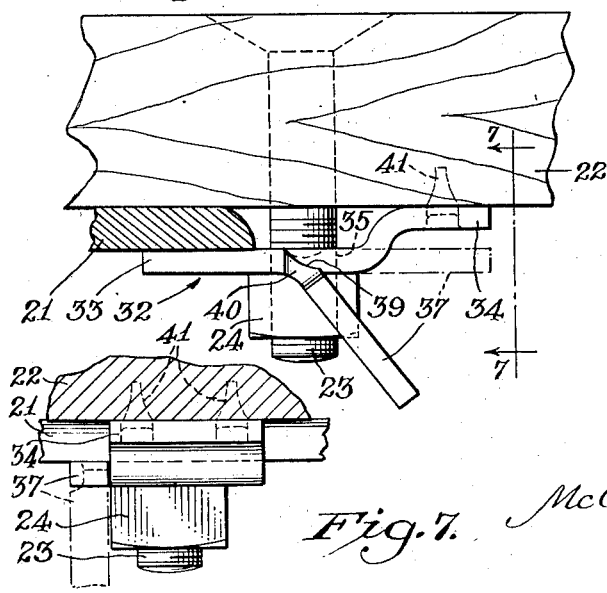
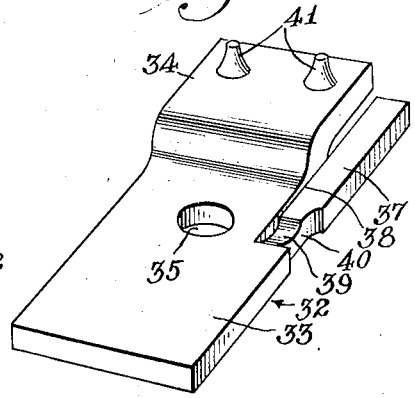
Inventor
Ernest G. Doke
BY
McCaleb, Wendt & Dickinson
Attorneys.

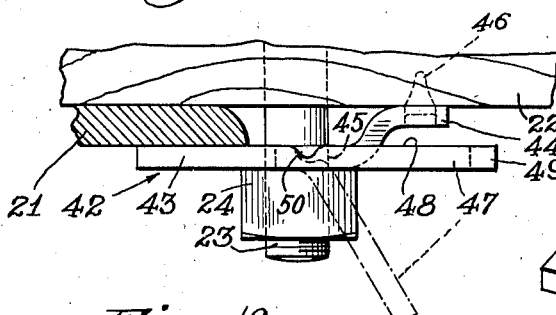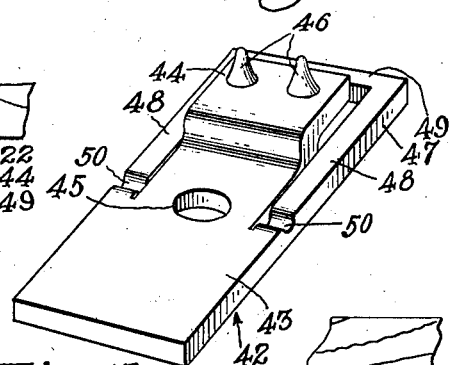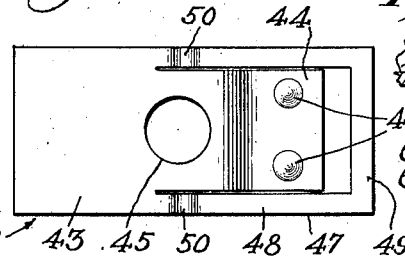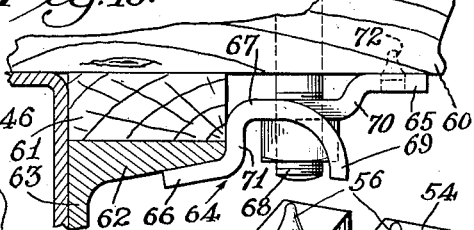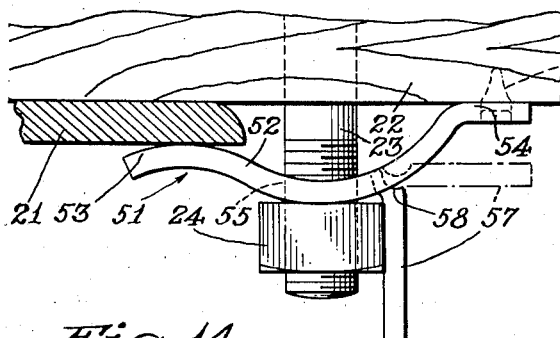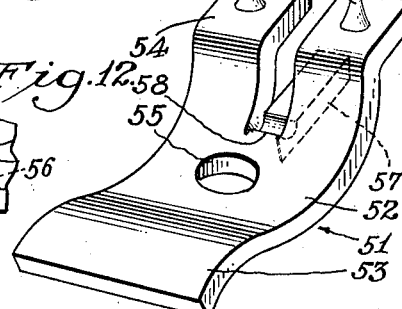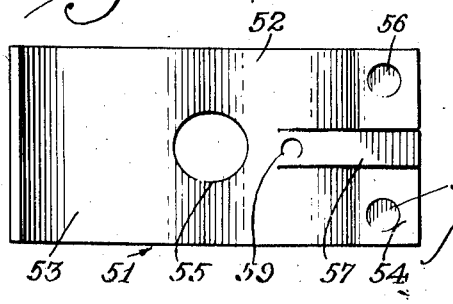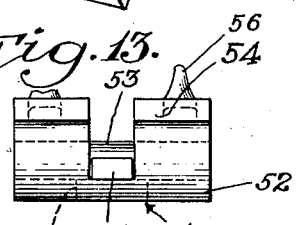

Patented May 23, 1944

2,349,490

UNITED STATES PATENT OFFICE 2,349,490

FLOOR SECURING CLIP

Ernest G. Doke, Chicago, Ill., assignor to Mac-Lean-Fogg Lock Nut Company, Chicago, Ill., a corporation of Illinois Application October 2, 1941, Serial No. 413,261

4 Claims. (Cl. 189—35)

This invention relates to clips for securing together offset members such as floor boards and their supporting sills in railway cars, or the like, and more particularly to such clips having offset engagement flanges which present broad contact or bearing areas to the engaged members. Such clips are customarily held in the securing relation by fastening bolts carried by and depending from the respective floor boards.

One object of the invention is to provide an improved floor securing clip of this type having the advantage over former clips in that the fastening bolt can be located much closer to the edge of the sill. The effect of this is a tighter and more positive contact of the offset clip flanges against the respective opposing surfaces of the floor board and the sill. In addition the clip may be made shorter and effects a substantial saving in material as compared with the prior clips.

An important feature to this end resides in having the fastening bolt pass through the sill-engaging flange portion of the clip instead of, as formerly, through the board-engaging flange.

In explanation of this distinction, it may be stated that where the bolt engages the floor-engaging flange, the securing force of the bolt is necessarily transmitted only indirectly to the sill-engaging flange through the medium of the offsetting bend which connects the flanges and lies between the bolt and the sill. If the sill then varies to a reduced thickness from that for which the flange offset was calculated, the contact between the sill-engaging flange and the sill will be relatively loose, irrespective of the force with which the bolt may be tightened against the board-engaging flange. Should the sill be of greater thickness than anticipated, fastening down of the board-engaging flange places the sill-engaging flange under undue strain, especially in the region of the offsetting bend which in such case would be too narrow. This may also cause the outer end portion of the sill-engaging flange to draw away from the sill and thus seriously reduce the area of the flange in engagement with the sill as well as shift the area of engagement closer to the edge of the sill than desirable.

In contrast, the offsetting bend which connects the flanges in my improved clip, instead of being interposed between the bolt and the sill, is located on the opposite side of the bolt, remote from the sill. When the nut of the bolt is driven home against the sill-engaging flange portion of the clip, the latter is drawn just as tightly against the sill as the board-engaging flange is drawn against the floor board. As a result, both flanges of the clip enter equally into the securing action of the clip, the freedom from unequal strain in the body of the clip avoids failure and loosening due to fatigue of any section of the clip, a substantial range of adaptability is attained for variations in sill thickness, and the springy or resilient qualities of the clip material are more effectually utilized.

Another object of the invention is to provide an improved floor securing clip of this general character in which the still-engaging flange structure carries means for locking the nut of the fastening bolt against loosening rotation.

A further object of the invention is to provide a floor securing clip having an integral bendable nut lock which, although it may be directly struck from the full thickness of the substantially bend-resisting body of the clip, is so reduced in cross section at the point of bending, that it may be bent with ease and without breaking.

Still another object of the invention is to provide an improved nut lock for a floor securing clip which is adapted for simultaneous engagement of opposite sides of the nut of a securing bolt and requires only a single bending operation for this purpose.

An additional object of the invention is to provide a floor securing clip which is particularly adaptable for meeting conditions of substantial variation in the offset relationship between the associated floor board and supporting sill.

Other objects and advantages will become apparent from the following description of specific embodiments of my invention and from the accompanying drawings illustrating the same, in which similar characters of reference indicate similar parts throughout the several views.

Referring to the drawings, of which there are two sheets:

Figure 1 is a fragmentary vertical sectional view taken through a conventional railway car floor structure showing a securing clip of the present invention in side elevation;

Fig. 2 is a bottom plan view of the securing clip;

Fig. 3 is a top perspective view of the same clip;

Fig. 4 is a view looking toward the right end of the clip considered with respect to Fig. 3;

Fig. 5 is a fragmentary vertical sectional view of a similar floor structure but showing a modified form of the securing clip in side elevation;

Fig. 6 is a top perspective view of the modified form of clip shown in Fig. 5;

Fig. 7 is an end elevational view of the modified clip taken substantially in the plane of line 7—7 of Fig. 5, but showing the nut-locking tongue in non-locking position;

Fig. 8 is a fragmentary vertical sectional view taken through a similar floor structure showing another modified form of the clip;

Fig. 9 is a top perspective view of the modified clip shown in Fig. 8;

Fig. 10 is a top plan view of the modified clip shown in Figs. 8 and 9;

Fig. 11 is a fragmentary vertical sectional view of a floor structure showing still another modified form of the securing clip;

Fig. 12 is a top perspective view of the modified clip shown in Fig. 11;

Fig. 13 is a right end elevational view of the clip considered with respect to Fig. 12;

Fig. 14 is a bottom plan view of the clip as shown in Figs. 12 and 13, with a slight modification in the nut-locking tongue; and Fig. 15 is a fragmentary vertical sectional view of a modified floor structure showing in side elevation a clip of the present invention modified to accommodate such floor structure.

Referring more particularly to Figs. 1 to 4 of the drawings, a clip 20 conforming to the present invention is shown in securing relation to a sill member 21 and a floor board member 22 which is supported by the sill 21 and presents a bottom surface area in offset relation to the lower face of the sill. A fastening bolt 23 projects downwardly from the floor board 22 close to the edge of the sill 21 and has a nut 24 threaded onto its lower end for fastening the clip 20 in place.

In order to permit substantial bearing engagement of the clip 20 with the lower surfaces of the sill 21 and the floor board 22, respectively, the clip is preferably constructed in an elongated, substantially rectangular shape, and has flat, relatively broad sill-engaging and board-engaging portions 25 and 27, respectively. These flange portions are integrally connected together in offset relation by a bend 28. Such offset relation is substantially complementary to the offsetting of the engaged surfaces of the sill and the floor board. Because of its simple design, the clip may be made inexpensively from plain flat sheet metal stock. This stock should be relatively stiff or resistant to bending under the conditions encountered in use.

A tighter engagement of the sill and the floor board by the flanges of the present clip than in prior forms is attained by engagement of the bolt 23 with the sill-engaging flange 25 instead of the board-engaging flange 27. For this purpose, the flange 25 is made longer than the flange 27, in the present instance twice as long, and has an aperture 29 for receiving the shank of the bolt 23. The aperture 29 is located at about the center of the inner half section of the flange 25 and thus is at about the center of the clip where the nut 24 can make full contact against the area of the clip surrounding the aperture. As a result, when the nut 24 is driven home against the apertured section of the flange 25, its thrust is substantially equally effective on both the closely adjacent sill contacting section of the flange 25 and on the board-engaging flange 27.

It may be noted that by the present arrangement, the bolt section of the flange 25 is adapted to project beyond the edge of the sill 21 and, in effect, forms a bridge over the gap between the edge of the sill and the offsetting bend 28 (Fig. 1). Since the nut 24 bears against the lowest face of the clip when installed, there is no problem of allowance for wrench clearance as in the prior clips, where the bolt passes through the board-engaging flange and has to be set back far enough from the offsetting bend to afford sufficient nut and wrench clearance.

To assure flat bearing contact of both of the flanges 25 and 27 under all practicable conditions, their bearing faces may initially lie in slightly convergent planes, that is, they may be toed in toward the outer ends of the flanges, as shown in broken outline in Fig. 1. When the clip is then drawn up into securing relation to the sill and the floor board, it may yield slightly at the bend 28 and allow the flange faces to assume full flatwise bearing engagement with the opposed sill and board surfaces. Another advantage of this toed-in relation of the flanges is that the flanges are fully engageable with respective sill and floor board surfaces, even though there may be some variation in the thickness of the sill 21. Moreover, due to the inherent resiliency of the clip material, this drawing up of the flanges stores energy in the clip which acts to take up slack that may develop in the course of time, as from shrinkage of the floor board 22.

Any tendency of the nut 24 of the fastening bolt toward loosening rotation because of vibrations in the floor structure, is avoided herein by driving one or more integral nut locks 30 on the clip into engaging relation to the lateral faces of the nut. As shown, the clip 20 is formed with a pair of nut locks 30 located at the respective opposite sides of the bridge section of the flange 25. Each of the locks 30 comprises a narrow strip or tongue severed directly from the body of the clip along a line 31 extending inwardly from one end of the body parallel with and close to the adjacent side of the clip. The arrangement is preferably such that the tongue 30 is not much wider than the thickness of the material from which it is cut. Thus, although the material may be substantially resistant to bending in a wide section, the narrow section of the tongue 30 affords only a slight resistance and the tongue may easily be bent into or out of nut-locking position. Adequate resistance to prevent turning of the nut 24 results from the adjacency and transverse character of the base of the tongue to the point of engagement with the nut and the edgewise relation of the tongue to the direction of rotative force that may be exerted by the nut.

The cuts or lines of severance 31 preferably lie in planes coincident with the respective planes of the opposite lateral faces to be engaged by the nut 24, considering the faces as being parallel with the respective adjacent sides of the clip. At their inner ends the lines of severance 31 extend to transversely alined points inwardly beyond the vertical center of the adjacent faces of the nut 24. Thus, the locking tongues 30 are not only each of such length as to be easily engaged by a bending tool, but are also each of sufficient extent to engage the adjacent lateral faces of the nut in effective locking relation, either individually or together. This is so whether the nut has left or right hand threads, and makes it possible to select whichever tongue is most convenient in any circumstance. Should either tongue break off, the remaining tongue will still give ample locking protection to warrant continued use of the clip.

Inasmuch as the base ends of the nut-locking tongues 30 are near the longitudinal center of the clip, the tongues may extend toward either the sill end or the board end of the clip, as preferred. Ordinarily, the most convenient arrangement, from the standpoint of manipulation of the locking tongues, will be that in which they extend toward the board-engaging end of the clip as shown.

In addition, the locking tongues 30 preferably extend initially within or below the upper face plane of the sill-engaging flange 25 and may have their ends curved down. This leaves a substantial clearance between the tongues and the flange 27 as well as the floor board 22 and also helps in getting a hold on the tongues for bending them into locking position.

Means for preventing rotation of the clip 20 about the axis of the bolt 23 may comprise one or more prongs 27a adapted to extend into the floor board 22. In the present instance the prongs 27a are formed to protrude from the body of the board-engaging flange 27, being pressed from the metal of the body, although they could be formed in any other acceptable manner. The prongs 27a, as will be apparent, are driven into the floor board 22 as an incident to fastening the clip in place. This expedient prevents turning of the clip due to the friction of the nut 24 as it is tightened, and also prevents turning of the clip should looseness of the clip occur because of shrinkage of the floor board 22. If the clip were to turn after the locking tongue 30 is in place, the tongue might act like a wrench to loosen the nut 24.

Where, as is possible, the clip 20 is used to connect together two metal members, the penetrating rotation-preventing prongs 27a may be omitted in favor of some other rotation-preventing expedient, or special sockets may be provided for the prongs in the metal member engaged by the flange 27. Where sockets are provided, of course, the prongs could just as well be formed on the flange 25 instead of the flange 27.

In the modified form of the invention shown in Figs. 5, 6 and 7, a floor-securing clip 32, in essential respects similarly constructed as the clip 20, has a relatively long sill-engaging flange 33 and an offset shorter board-engaging flange 34. The flanges 33 and 34 may also be toed in for assuring flat contact with the sill 21 and the floor board 22 when the clip is drawn up tight. The flange 33 has a bolt hole 35 in the section nearest the offsetting bend which connects the flanges.

Instead of having two nut-locking tongues, the clip 32 may have only one such tongue 37 formed integrally with the sill-engaging flange 33 by severance of a narrow strip from the side edge of the clip along a line 38. This line of severance terminates adjacent the area of the flange 33 to be engaged by the nut 24 of the attaching bolt and preferably substantially inwardly beyond the transverse center line of the aperture 35. By preference, the locking tongue 37 is formed on that side of the clip toward which the nut 24 must be turned to be loosened. This will be at the left side of the clip (when one faces the board-engaging flange end of the clip, as in Fig. 7) where the nut has the more usual right-hand threads, and at the right side of the clip for left-hand threads, although either type of nut can, because of the deep incutting of the tongue, actually be effectually locked by the tongue regardless of the side on which the tongue is formed.

In its non-locking position, the tongue 37 may lie in the same plane as the flange 33, as shown in dot-dash outline in Fig. 5 and in full lines in Figs. 6 and 7 so that the tongue remains clear of interference with convenient manipulation of the nut 24. After the nut 24 has been driven home, the tongue may be bent down, as shown in full line in Fig. 5 and in dot-dash outline in Fig. 7, into locking engagement with that portion of the lateral face of the nut which must advance rotatively in order to loosen the nut.

For the purpose of facilitating bending of the locking tongue 37, its cross-sectional area at the point of bending, preferably closely adjacent the base of the tongue, may be substantially reduced as by means of a groove 39 extending transversely of the upper face of the tongue. This is the opposite face from that toward which the tongue is bent for movement into locking position. The groove 39 so far weakens the resistance to bending at that point as compared with the remainder of the tongue, that the tongue will remain substantially straight when subjected to ordinary bending force and thus undistorted and less liable to invite careless manipulation and damage. The tongue 37 may be even further or alternatively weakened at the point of bending by means of a notch 40 in the outside face of the clip. The groove and notch are preferably rounded and may be formed by a pressing operation or by removal of the metal. The notch 40 may be punched out at a suitable stage in the formation of the clip.

The flange 34 may be formed with rotation-preventing prongs 41 adapted to penetrate the floor board 22 when the clip is secured in place.

In the modification shown in Figs. 8, 9 and 10, a securing clip 42 has been provided which, like the above-described forms of the clip, includes an elongated sill-engaging flange 43 and a shorter offset board-engaging flange 44. These flanges may also be initially toed in for the same purpose. The sill-engaging flange 43 has a bolt hole 45. Rotation-preventing prongs 46 on the flange 44 are adapted to penetrate the floor board 22.

A particular feature of the clip 42 resides in the nut-locking means which may be in the form of an integral rectangular frame 47 having a pair of easily bendable nut-locking tongues or arms 48. These arms are severed as narrow strips from the side margins of the clip body and have their bases integral with the sill-engaging flange 43 adjacent the area of the flange surrounding the bolt hole 45 and against which the thrust of the fastening bolt nut 24 is directed. At their outer ends, the locking arms 47 are integrally connected together by means of a crossbar 49. This permits both of the arms 48 to be simultaneously bent into nut-locking position by a single effort applied by an appropriate tool to either of the arms or to the crossbar 49.

In the production of the clip 42, the nut-locking frame 47 is preferably formed to lie in the same plane as the surface against which the nut 24 engages, in the present instance the plane of the flange 43. In this construction, the floor-engaging flange 44 may consist of that portion of the material of the clip body which is severed from within the frame.

Bending of the nut-locking frame 47 into or out of locking position relative to the nut 24 is preferably facilitated by substantial reduction in thickness of the arms 48, particularly adjacent their connection with the body of the clip, as by means of transverse grooves or notches 50 formed in alignment across the base portions of the arms.

The form of the invention shown in Figs. 11 to 14, inclusive, provides a clip 51 which is particularly adapted for efficiently accommodating substantial variations in the thickness of the supporting sill of the floor. For this purpose, the clip 51 comprises an elongated main, or sill-engaging flange 52, which is of arcuate or concavo-convex shape longitudinally. The flange 52 is provided at one end with an oppositely curved, offset section or lip 53 which makes the actual bearing contact with the sill 21. At the opposite end of the flange 52 is an integral, flat board-engaging flange 54 which has its engagement face substantially offset from both the curved bearing face of the lip 53 and from the main body of the flange 52.

The flange 54 is preferably formed with board-penetrating prongs 56 to hold the clip against turning.

At approximately the center of the main arc of the flange 52 is formed a bolt hole 55. This hole is preferably slightly oversize, such as elliptical longitudinally of the clip, so as to permit rocking adjustment of the clip relative to the bolt 23 to accommodate various thicknesses of sill. With this arrangement thorough engagement of both the sill and the floor board is effected irrespective of substantial variations which may occur in the thickness of the sill 21 in different floor installations or even in the same floor.

An integral nut-locking tongue 57 may be severed from the body of the clip 51 on an axis longitudinally aligned with the axis of the bolt hole 55. In the present instance the locking tongue 57 is cut out of the longitudinal central portion of the flange 54 and the adjacent portion of the flange 52, and is of a narrow width not substantially greater than the thickness of the material of the clip body. The tongue is initially located in a plane substantially offset from the board-engaging flange 54, as shown in dot-dash outline in Fig. 11 and in full outline in Figs. 12 and 13, so as to facilitate engagement of the tongue by means of a suitable tool when the tongue is to be bent into nut-locking engagement.

Bending of the tongue may be facilitated by substantially reducing the cross-sectional area at the point of bending. Thus, the base of the tongue may be weakened, as for example, by means of a transverse notch or groove 58, located vertically above the position assumed by the adjacent edge of the nut 24 (Figs. 11 and 12) or by a hole 59 driven entirely through the base of the tongue (Fig. 14). The tongue 57 may then be bent down into nut-locking position easily and without breaking and it may remain substantially straight and engage fully with the opposed lateral face of the nut.

As shown in Fig. 15, the present clip may readily be adapted in construction for accommodating relative offsets between the members to be secured which are greater than the range of offset variations that can be efficiently taken care of by any given offset produced by the bend between the board-engaging flange and the intermediate bolt-receiving area of the clip. This condition may be met in the reconstruction and modernizing of railway cars as where a wooden sided car is converted into a steel sided car of increased inside width. The reconstructed floor may comprise floor boards 60, of which one is shown, supported upon a filler block 61 above a sill 62 provided by the top flange of the old side sill channel 63 of the floor. Thus, the offset between the floor board 60 and the sill 62 is increased over normal by the thickness of the filler block 61.

A bridge type securing clip 64 adapted for this oversize offset may embody the features of any of the forms of the clip already described, and has a one-piece body including a board-engaging flange portion 65 and a sill-engaging flange portion 66. The engagement faces of these flange portions are offset to correspond substantially to the offset between the opposed faces of the floor board and sill. Intermediate and offset from both of the flange portions is an integral bridge area 67, which is apertured to receive a fastening bolt 68 and is equipped with one or more nut-locking tongues 69. In the present instance, the board-engaging flange 65 and the bolt area 67 are joined by an offsetting bend 70 of width that may be of a standard with the other clips of this type, so as to arrive at a uniform offsetting for the area 67 to permit a standard, reasonably short bolt to be used. The sill-engaging flange 66, however, is joined to the area 67 by an integral offsetting bend section 71, which is as wide as necessary, and may be varied in specification as required, to accommodate the specific offset condition of the floor structure. While the offsetting section 71 might be omitted and the offsetting bend 70 correspondingly increased in width, this would increase the cost of the construction by requiring a longer bolt.

Although the offsetting section 71 may butt against or so closely approach the edge of the sill 62 as to hold the clip 64 against turning about the bolt 68, the flange 65 may be formed with integral rotation-preventing prongs 72 which will be driven into the floor board 60 when the clip is drawn up thereagainst.

From the foregoing, it will be apparent that the present invention provides an improved floor securing clip which is adapted for tighter engagement with the sill because the fastening bolt can be located closer to the edge of the sill. This also permits the clip to be made substantially shorter than prior floor clips of this kind and effects important savings in material. Moreover, because the space between the bolt and the edge of the sill is free, substantially greater tolerance is provided, as compared with prior clips, for possible inaccuracies in spotting the bolt holes in the floor boards. This is particularly true with regard to placing the bolt holes closer to the edge of the sill than the specifications call for, which would be fatal with a clip having the offsetting bend between the bolt and the sill edge, but is of no consequence with the present clip (disregarding the oversize offset form of the clip shown in Fig. 15) because such bend is on the opposite side of the bolt. The present clip is also better adapted to accommodate limited as well as great variations in thickness of sill.

The nut-locking tongue on the sill-engaging flange portion of the clip is conveniently arranged to be bent into or out of nut-locking position. Bending of the nut-locking tongue is considerably facilitated by the reduction in cross-sectional area thereof at the point of bending. A pair of locking tongues may be simultaneously bent into or out of locking engagement.

Since the clip is adapted to be constructed from plain flat sheet metal stock, it may be manufactured more economically than clips which require a specially rolled section.

While the invention is susceptible of various modifications, and alternative constructions, I have shown in the drawings, and have herein described in detail certain preferred embodiments, but it is to be understood that I do not thereby intend to limit the invention to the specific forms disclosed, but intend to cover all modifications and alternative constructions falling within the spirit and scope of the invention as expressed in the following claims.

I claim as my invention:

1. A rigid unitary floor securing clip of the character described comprising, in combination, a sill-engaging flange, a horizontal board-engaging flange of substantial area, an integral web connecting said flanges, the major portion of said web being offset from the board-engaging flange whereby it occupies a position in spaced relation to the board when installed, said major portion of said web being provided with an opening to receive a fastening bolt, and a tongue projecting from said major portion and in adjacent vertically spaced relation to the opposed face of the board-engaging flange throughout its full extent whereby it may be readily engaged by a tool inserted between the opposed faces of the board engaging flange and tongue and bent into locking engagement with a nut on said bolt and in engagement with said major portion.

2. A floor securing clip of the character described comprising, in combination, a sill-engaging flange, a horizontal board-engaging flange, an intermediate web integral with said flanges and conformed to effect offsetting of the board-engaging flange from the sill-engaging flange and the major portion of said web, whereby said major portion of said web occupies a position in vertically spaced relation to the board when installed, said sill-engaging flange and said major portion of said web being substantially coplanar, said major portion of said web being provided with an opening to receive a fastening bolt, and a tongue projecting from said major portion in generally parallel and vertically spaced relation to said board-engaging flange throughout its full extent whereby said tongue may be readily engaged at points therealong by a tool inserted between the opposed faces of the board engaging flange and tongue and bent into locking engagement with a nut on said bolt and in engagement with said major portion.

3. A floor securing clip of the character described, comprising, in combination, a sill-engaging flange, a horizontal board-engaging flange, an intermediate web integral with said flanges and conformed to effect offsetting of the board-engaging flange from the sill-engaging flange and the major portion of said web, whereby said major portion of said web occupies a position in spaced relation to the board when installed, said sill-engaging flange and said major portion of said web being substantially co-planar, said major portion of said web being provided with an opening to receive a fastening bolt, a tongue projecting from the opposed face of said major portion on each side of the clip in generally parallel and vertically spaced relation to said board-engaging flange, and a transverse member extending between the ends of said tongues and in vertically spaced relation to said board-engaging flange whereby the tongue assembly may readily be engaged at points therealong by a tool inserted between the opposed faces of the board engaging flange and tongue assembly and bent away from said board-engaging flange into locking engagement with a nut on said bolt and in engagement with said major portion.

4. A substantially rigid unitary clip for securing a floor board to a sill whose lower faces are in spaced relation, comprising a flat portion of substantial area for engaging the lower face of the floor board, a second flat portion of substantially greater length than the first flat portion for engaging the lower face of the sill throughout substantially half the length of said second portion, said flat portions being offset to substantially the extent of said lower faces of the board and sill and being interconnected by a curved portion, an opening in said second flat portion for receiving a bolt extending through the floor board adjacent said sill, said flat portions normally slightly diverging with respect to the planes of said lower faces and being bendable about said double curved portion for full surface bearing contact with said faces under the pressure of a nut threaded onto said bolt, and a bendable nut lock member projecting from said second flat portion past said opening and in generally parallel and vertically spaced relation to said first flat portion throughout its full extent thereby providing for ready nut manipulation while facilitating bending of the nut locking member into nut locking position by a tool inserted between the opposed faces of said first flat portion and said member.

ERNEST G. DOKE.